United States Patent
Weichardt et al.

[11] 3,729,919
[45] May 1, 1973

[54] DRAG ROPE FOR SUBMARINE MEASURING EQUIPMENT

[75] Inventors: Helmut Weichardt, Hannover-Linden; Fritz Glander, Isernhagen NB; Gerhard Ziemek, Hannover; Walter Schuppe, Hannover; Hans Meyer, Hannover; Bernd Eilhardt, Vinnhorst, all of Germany

[73] Assignee: Kabel -und Metallwerke Gutehoffnungshutte Aktiengesellschaft, Hannover, Germany

[22] Filed: Nov. 13, 1970

[21] Appl. No.: 89,299

[52] U.S. Cl. ............................................57/144
[51] Int. Cl. ........................D07b 1/12, D07b 1/16
[58] Field of Search ............57/139, 140 R, 140 BL, 57/140 C, 144, 149, 153, 164, 7

[56] References Cited

UNITED STATES PATENTS

| 2,188,755 | 1/1940 | Markuson | 57/3 X |
| 3,395,530 | 8/1968 | Campbell | 57/153 |
| 3,526,086 | 9/1970 | Morgan | 57/149 |

FOREIGN PATENTS OR APPLICATIONS

| 891,618 | 3/1962 | Great Britain | 57/140 BL |

*Primary Examiner*—Donald E. Watkins
*Attorney*—Smyth, Roston & Pavitt

[57] ABSTRACT

A multi-layer drag rope for submarine measuring cables having plural layers of polyurethane and polyamide mesh, with solid or hollow core.

10 Claims, 4 Drawing Figures

Patented May 1, 1973  3,729,919

INVENTORS:
Helmut Weichardt
Fritz Glander
Gerhard Ziemek
Walter Schuppe
Hans Meyer
Bernd Eilhardt Smyth, Roston & Pavitt
By Ralf H. Siegemund
ATTORNEYS

DRAG ROPE FOR SUBMARINE MEASURING EQUIPMENT

The present invention relates to construction of a rope used as drag rope or towing cable for submarine measuring equipment. Geologic configuration underneath the surface of the sea, seismic waves and other submarine phenomena are investigated and measured by means of so-called submarine measuring cable. Such a measuring cable is comprised of a regular underwater cable to which are connected very sensitive equipment such as hydrophones etc. The measuring cable is dragged through ocean water by means of a rope tied to a towing vessel. Such an exploration vessel carries registering and indicating equipment receiving data from the equipment of the measuring cable via connecting lines.

Accuracy of measurement of the type described, depends to a considerable extent upon maintaining the measuring cable in a constant position relative to the surface of the sea. However, sooner or later, the vessel will roll in heavy sea, making it rather difficult to maintain the measuring cable in that desired position. In case the dragging rope is not sufficiently resilient and does not, or hardly extends elastically, intermittent impact stress, shocks etc. will be transmitted by the drag rope upon the measuring cable, and the latter will be subjected to tension forces of considerable magnitude accordingly.

It is an object of the present invention to provide a drag rope for submarine measuring cable which will extend resiliently upon impact. In accordance with the preferred embodiment of the invention, it is suggested to provide the rope from plural, concentrically superimposed layers of elastic, resiliently deformable (i.e. flexible and extendible), plastic material, that is tension proof, (i.e. has high tensile strength. Polyurethane and polyamide (e.g. nylon) were found to be particularly suitable for that purpose, as these materials have the required mechanical properties and are also chemically resistive. The elastic limit or breakage load and elastic elongation or extension as well as irreversible or permanent extension can be controlled over wide ranges through appropriate selection of the polyamide layer or layers; the parameters for such selection are particularly the type and configuration of the polyamide layers, the respective layer thickness or thicknesses and the type of mesh or plait used.

As to mechanical properties, polyurethane layers are quite similar to polyamide layers; however, polyurethane is very insensitive to oxygen and is rather impermeable to water so that the outer lining of the rope is preferably a polyurethane jacket.

The following data show the mechanical properties of a rope made in accordance with the invention and having an elastic limit (i.e. breakage load) in excess of 2.5 tons (metric). Elastic elongation is about 10 to 50 percent and irreversible or permanent extension is 5 percent maximum; effective drag force modified by tension at 50 percent elastic elongation is 2.0 tons (metric).

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
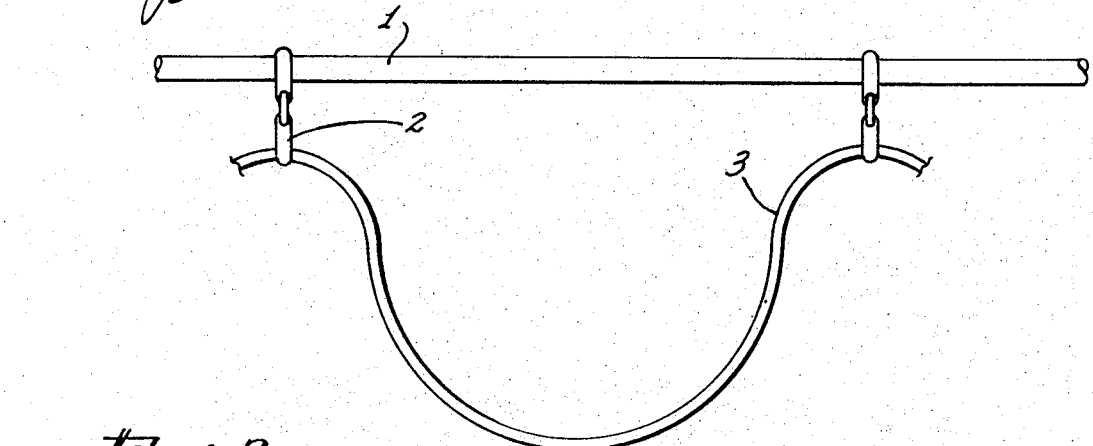
FIG. 1 illustrates a drag rope with suspension of the connecting lines for the measuring cable from the rope.

Proceeding to the detailed description of the drawings, FIG. 1 illustrates a drag rope or towing cable 1 made of elastic, plastic material of high tensile strength. A connecting line 3 (or a plurality thereof) is suspended from rope 1 by means of clamps 2 or the like. One end of rope 1 is secured to the measuring cable and equipment (not shown) and the line 3 connects to that equipment. The other end of rope 1 is secured to the towing vessel, and line or lines 3 lead to indicating equipment on the vessel. Connecting line 3 has length that is larger than the length of rope 1 even at maximum expected elongation so that the line 3 is never placed under tension.

Figure 2:
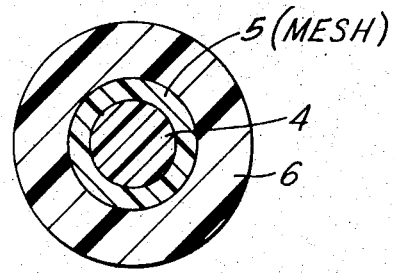
FIG. 2 illustrates a cross section through the rope used in FIG. 1 and constructed in accordance with a first example for practicing the preferred embodiment of the present invention.

The particular rope 1 used as carrier and towing cable, is shown in cross section in FIG. 2. The rope has a core 4 consisting, for example, of polyurethane. A mesh or plait of polyamide fibers or strands establishes a layer 5 on core 4. Another layer 6 of polyurethane constitutes an outer jacket for lining the rope but being part thereof. Core 4, with mesh layer 5 could be replaced by a stranded polyamide rope that is provided additionally with one or several plastic layers. The outer jacket or cladding, however, is preferably provided always as a polyurethane layer, to serve as protection against ocean water.

Figure 3:
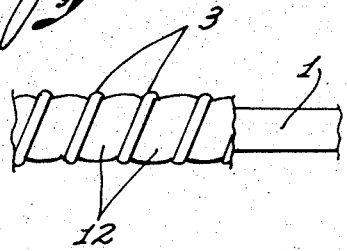
FIG. 3 illustrates a different support arrangement for an equipment connecting line on a rope constructed as shown in FIG. 2.

In cases, it is desirable to provide construction offering little flow resistance to water during dragging. This can be accomplished by winding the connecting line or lines helically onto rope 1, possible covering the latter completely. If the line 3 is not sufficiently long for complete coverage, the spacing in between windings should be filled with semirigid foam or polyurethane 12, as shown in FIG. 3.

Figure 4:
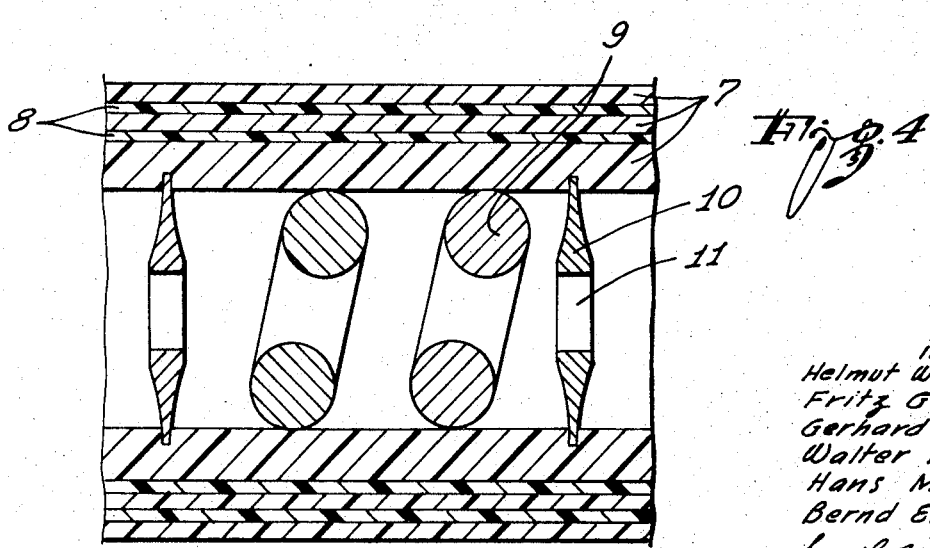
FIG. 4 illustrates a longitudinal section view through a portion of a rope with hollow core in accordance with a second example of the preferred embodiment of the present invention.

A somewhat different construction is illustrated in FIG. 4. There are shown plural, concentric layers 7 of polyurethane and polyamide mesh layers 8 are respectively interposed between some of the polyurethane layers. The core of the rope is a hollow cylinder established by the innermost layer or tube 7. A connecting line 9 runs in and through the interior space of that hollow core. A plurality of support disks 10 are disposed in spaced-apart relationship along the extension of the hollow core. In case of severe tension on the rope in longitudinal direction, there is the tendency for contraction, i.e., the radial dimension of that hollow core will tend to reduce so that line 9 would be compressed and, possibly, damaged. Disks 10 serve to prevent (or significantly impede) such radial contraction of the inner tube 7. Disks 10 have bores 11 through which pass the connecting line 9; the line 9 forms a helix in between each two adjacent disks 10.

The disks 10 could be replaced by a support helix providing a somewhat smaller channel or duct for the connecting line.

The invention is not limited to the embodiments described above but all changes and modifications thereof not constituting departures from the spirit and scope of the invention are intended to be included.

We claim:

1. Drag rope for submarine measuring cable to be connected to a towing vessel and provided as support of a connecting line or lines running between the vessel and the measuring cable, comprised of a hollow core and a plurality of concentrically superimposed layers of elastic resiliently extendable plastic material on the core having high tensile strength.

2. Rope as in claim 1, the rope comprised of plural layers of polyurethane and polyamide.

3. Rope as in claim 1, there being plural support elements provided in the hollow core, along the extension thereof.

4. Rope as in claim 3, comprised of four polyurethane layers and two polyamide mesh layers embedded in between.

5. Rope as in claim 1, the connecting lines disposed in the interior of the hollow core.

6. Rope as in claim 1, the rope including at least one layer of polyamide mesh.

7. Drag rope for submarine measuring cable to be connected to a towing vessel and provided as support of a connecting line running between the vessel and the measuring cable, comprised of a plurality of concentrically superimposed layers of elastic, resiliently extendable plastic material having high tensile strength, the connecting line being helically wound on the rope, spacing between the helical windings being filled with semirigid polyurethane foam.

8. Drag rope for submarine measuring cable to be connected to a towing vessel and provided as support of a connecting line or lines running between the vessel and the measuring cable, comprised of a plurality of concentrically superimposed layers of elastic, resiliently extendable plastic material having high tensile strength, at least one layer being a polyamide mesh.

9. Rope as in claim 8, having a polyurethane core, a mesh of polyamide on the core, and an outer polyurethane jacket.

10. Rope as in claim 8, comprised of a polyamide rope as core with a polyurethane lining.

* * * * *